US011315569B1

(12) United States Patent
Talieh et al.

(10) Patent No.: US 11,315,569 B1
(45) Date of Patent: Apr. 26, 2022

(54) TRANSCRIPTION AND ANALYSIS OF MEETING RECORDINGS

(71) Applicant: Memoria, Inc., Saratoga, CA (US)

(72) Inventors: Homayoun Talieh, San Jose, CA (US); Rémi Berson, Munich (DE); Eric Pellish, New Haven, CT (US)

(73) Assignee: Memoria, Inc., Sunny Isles Beach, FL (US)

( * ) Notice: Subject to any disclaimer, the term of this patent is extended or adjusted under 35 U.S.C. 154(b) by 252 days.

(21) Appl. No.: 16/785,326

(22) Filed: Feb. 7, 2020

Related U.S. Application Data

(60) Provisional application No. 62/886,246, filed on Aug. 13, 2019, provisional application No. 62/802,569, filed on Feb. 7, 2019.

(51) Int. Cl.
| | |
|---|---|
| *G10L 15/26* | (2006.01) |
| *G06N 20/00* | (2019.01) |
| *G06F 16/34* | (2019.01) |
| *G06F 40/20* | (2020.01) |

(52) U.S. Cl.
CPC ............ *G10L 15/26* (2013.01); *G06F 16/345* (2019.01); *G06F 40/20* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 9,443,518 B1* | 9/2016 | Gauci | G10L 15/26 |
| 2010/0268534 A1* | 10/2010 | Kishan Thambiratnam | G10L 15/26 704/235 |
| 2015/0106091 A1* | 4/2015 | Wetjen | H04M 3/568 704/235 |
| 2015/0120825 A1* | 4/2015 | Waxman | H04L 67/36 709/204 |
| 2017/0061973 A1* | 3/2017 | Baier | G11B 27/034 |
| 2017/0093590 A1* | 3/2017 | Chinnapatlolla | H04L 65/1089 |
| 2018/0046710 A1* | 2/2018 | Raanani | G06F 16/683 |
| 2019/0179595 A1* | 6/2019 | De Angelis | G06F 16/639 |
| 2020/0135204 A1* | 4/2020 | Robichaud | G10L 17/06 |

* cited by examiner

*Primary Examiner* — Stella L. Woo
(74) *Attorney, Agent, or Firm* — Yantra Patents LLC; Anand P Narayan

(57) ABSTRACT

Disclosed is a system for generating a transcript of a meeting using individual audio recordings of speakers in the meeting. The system obtains an audio recording file from each speaker in the meeting, generates a speaker-specific transcript for each speaker using the audio recording of the corresponding speaker, and merges the speaker-specific transcripts to generate a meeting transcript that includes text of a speech from all speakers in the meeting. As the system generates speaker specific transcripts using speaker-specific (high quality) audio recordings, the need for "diarization" is removed, the audio quality of recording of each speaker is maximized, leading to virtually lossless recordings, and resulting in an improved transcription quality and analysis.

31 Claims, 5 Drawing Sheets

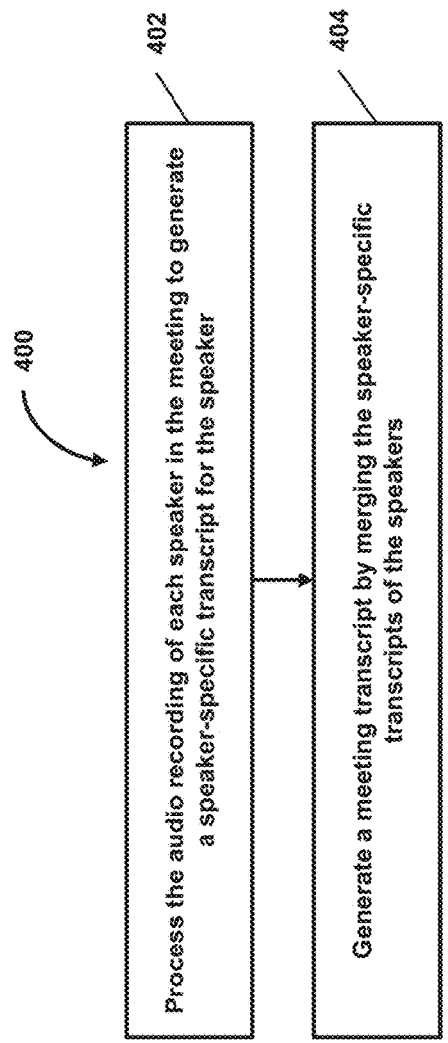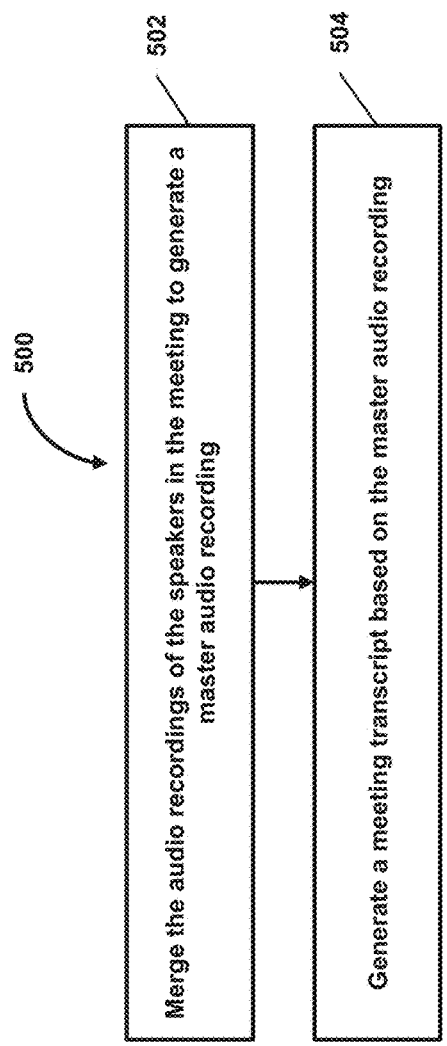

TRANSCRIPTION AND ANALYSIS OF MEETING RECORDINGS

CROSS-REFERENCE TO RELATED APPLICATIONS

The present application claims priority from U.S. Provisional Patent Application No. 62/886,246, titled TRANSCRIPTION AND ANALYSIS OF MEETING RECORDINGS filed on Aug. 13, 2019, and U.S. Provisional Patent Application No. 62/802,569, titled METHODS AND APPARATUS FOR MEETING TRANSCRIPTION AND SUMMARY filed on Feb. 7, 2019, both of which are incorporated herein by reference in their entireties.

BACKGROUND

Audio recording from participants of a meeting are typically collected in a batched manner, where voices of multiple speakers are potentially mixed in a single track (Otter, Voicea, AWS Lex, etc.). To perform transcription in these conditions requires the audio recordings to be pre-processed via "diarization" to associate each voice to a speaker. This involves advanced machine learning models, induces a high processing cost and introduces errors. It also suffers from bandwidth limitations of each participant during the meeting; often limiting the quality of audio recordings. Moreover, multiple participants speaking at the same time will introduce even more inaccuracies. The quality of the transcription based on the output of this "diarization" will cumulate errors of both processes (diarization+transcription), leading to poor-quality results.

SUMMARY

Aspects of the disclosed embodiments relate to methods, apparatuses, and/or systems for generating a transcript of a meeting using individual audio recordings of speakers in the meeting.

In some embodiments, a system obtains an audio recording file from each speaker in the meeting, generates a speaker-specific transcript for each speaker using the audio recording of the corresponding speaker, and merges the speaker-specific transcripts to generate a meeting transcript that includes text of a speech from all speakers in the meeting. As the system generates speaker-specific transcripts using (high quality) speaker-specific audio recordings, in some embodiments, the need for "diarization" is removed, the audio quality of recording of each speaker is maximized, leading to virtually lossless recordings, and resulting in an improved transcription quality and analysis.

During the meeting, the system broadcasts an audio/video stream ("AV stream") to client devices of all the speakers participating in the meeting for facilitating real-time collaboration. The AV stream can include an audio feed or video feed from each speaker in the meeting. The system also creates an audio recording of a voice of a speaker and stores the audio recording at a client device of the speaker (e.g., until the meeting concludes). This audio recording includes voice of a specific speaker (e.g., voice of the speaker associated with the client device where the audio recording is created) and not of other speakers. This audio recording is different from and independent of the AV stream that is broadcasted to the client devices for conference. The system transmits the audio recording from the client device to a transcription subsystem for generating a speaker-specific transcript from the audio recording. Such audio recordings are created at a client device of each of the speakers and transmitted to the transcription subsystem for generating a speaker-specific transcript for each of the speakers. The system can merge the speaker-specific transcripts to generate a meeting transcript, which includes text of the speech from all speakers in the meeting. The system can merge the speaker-specific transcripts based on a timestamp associated with the text from each of the speaker-specific transcripts.

The audio recordings can be transmitted to the transcription subsystem in real time (e.g., during the meeting and as and when the recording is created), asynchronously (e.g., independent of when the recording is created or the meeting concludes), or based on network bandwidth availability during the meeting. Further, the speaker-specific transcripts or the meeting transcript can be generated in real time (e.g., as and when a speaker speaks) or asynchronously (e.g., independent of when the speakers speak, or independent of when the meeting concludes).

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 4 shows a flowchart of a method for generating a meeting transcript using speaker-specific audio recordings, in accordance with one or more embodiments.

FIG. 5 shows a flowchart of another method for generating a meeting transcript using speaker-specific audio recordings, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
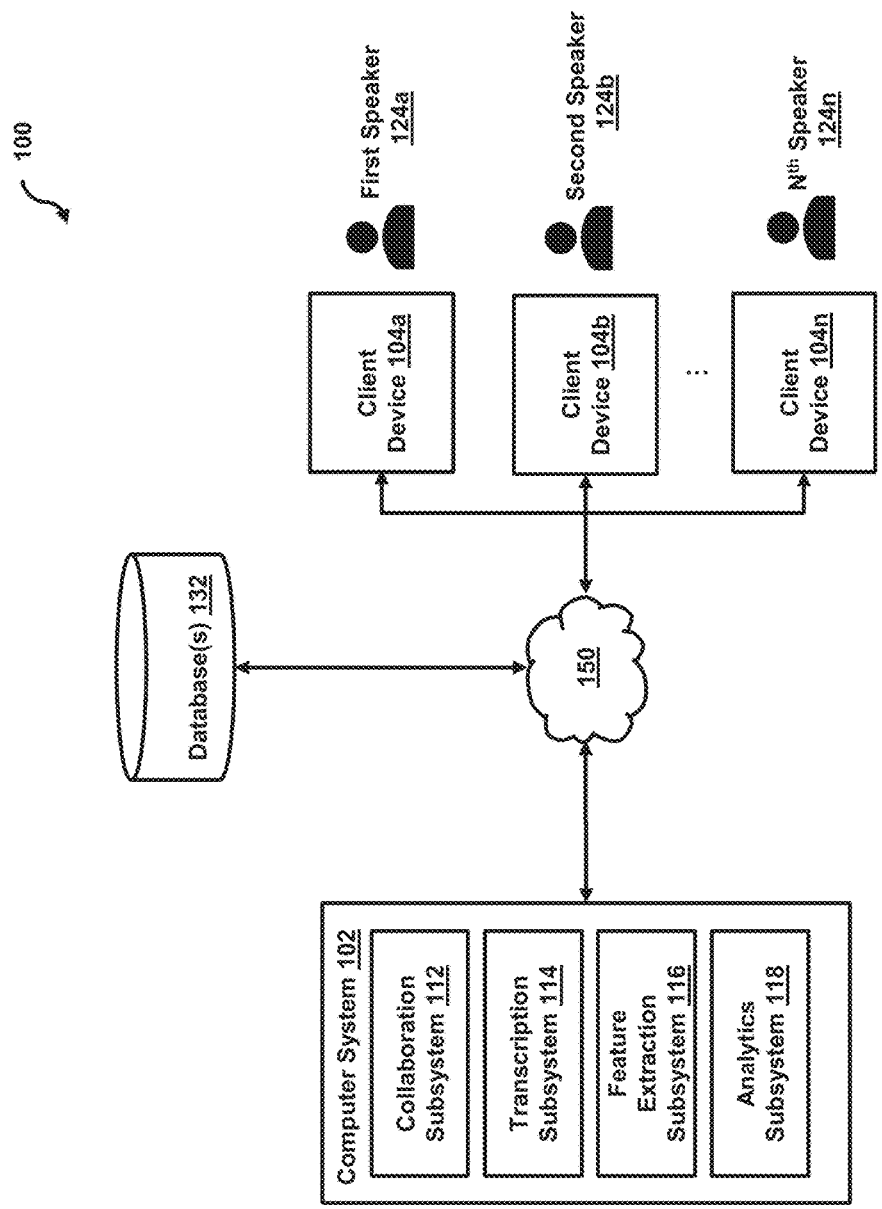
FIG. 1 shows a system for facilitating transcription and analysis of an online meeting, in accordance with one or more embodiments.

FIG. 1 shows a system 100 for facilitating transcription and analysis of an online meeting, in accordance with one or more embodiments. As shown in FIG. 1, system 100 may include computer system 102, client device 104 (client devices 104a-104n), or other components. Computer system 102 may include collaboration subsystem 112, transcription subsystem 114, feature extraction subsystem 116, analytics subsystem 118, or other components. By the way of example, computer system 102 may include a distributed system, a cloud-based system, or other systems. Each client device 104 may include any type of mobile terminal, fixed terminal, or other device. By the way of example, client device 104 may include any computing device, such as a personal computer (PC), a laptop computer, a tablet computer, a hand-held computer, other computer equipment. Users may, for instance, utilize one or more client devices 104 to interact with one another, one or more subsystems, or other components of system 100. For example, users (also referred to as "speakers") 124a to 124n may participate in an online meeting using their client devices 104a-104n, respectively. Further, the speakers may participate in the online meeting via a web-browser by accessing a uniform resource locator (URL) associated with computer system 102, or via an "app" of computer system 102 installed on client device 104. In some embodiments, an online meeting is a collaboration between the speakers 124 facilitated by computer system 102 via a communication network 150 (e.g., Internet, a mobile phone network, a mobile voice or data network, a cable network, a public switched telephone network, or other types of communications networks or combinations of communications networks). The communication network may be a wireless or wired network. A component of system 100 may communicate with one or more components of system 100 via the communication network 150.

It should be noted that, while one or more operations are described herein as being performed by particular components of system 100, those operations may, in some embodiments, be performed by other components of system 100. As an example, while one or more operations are described herein as being performed by a component of computer system 102, those operations may, in some embodiments, be performed by another component of computer system 102. As another example, while one or more operations are described herein as being performed by components of computer system 102, those operations may, in some embodiments, be performed by components of client device 104.

In some embodiments, system 100 facilitates generation of a transcript of an online meeting between multiple speakers. During the meeting, system 100 receives audio/video ("AV") data from speakers 124 participating in the meeting, combines them into a single AV stream in real-time and broadcasts the AV stream to client devices 104 of speakers 124. The AV stream can include an audio feed or video feed from each of the speakers in the meeting. The AV stream is optimized for real-time collaboration. That is, system 100 may adapt bitrate of the AV stream in real-time depending on available network bandwidth, latency, etc. The AV stream can include a single channel that carries the AV data of all speakers 124. System 100 also creates an audio recording at each client device, which includes a voice of a specific speaker (e.g., speaker associated with the client device). The audio recording is device-specific or speaker-specific. As an example, system 100 creates a first audio recording at first client device 104a, which includes a voice of first speaker 124a associated with first client device 104a. The first audio recording does not include a voice of speaker other than that of first speaker 124a. System 100 creates such an audio recording for each of the speakers 124 and stores the audio recordings at their respective client devices 104. The speaker-specific audio recording may be of a high-quality (e.g., bitrate of the recording is above a specified threshold) and not limited by any Internet bandwidth limitation. The speaker-specific audio recordings are different from and independent of the AV stream broadcasted to client devices 104.

System 100 may use the speaker-specific audio recordings to generate speaker-specific transcripts, meeting transcript, or analytics associated with the meeting. As an example, system 100 may generate a first transcript, which includes a text of a speech of first speaker 124a, using the first audio recording of first speaker 124a. Similarly, system 100 may generate speaker-specific transcripts for other speakers using speaker-specific audio recordings. System 100 may combine all the speaker-specific transcripts to generate a meeting transcript, which includes a text of speech of all speakers 124 participating in the meeting.

Figure 2:
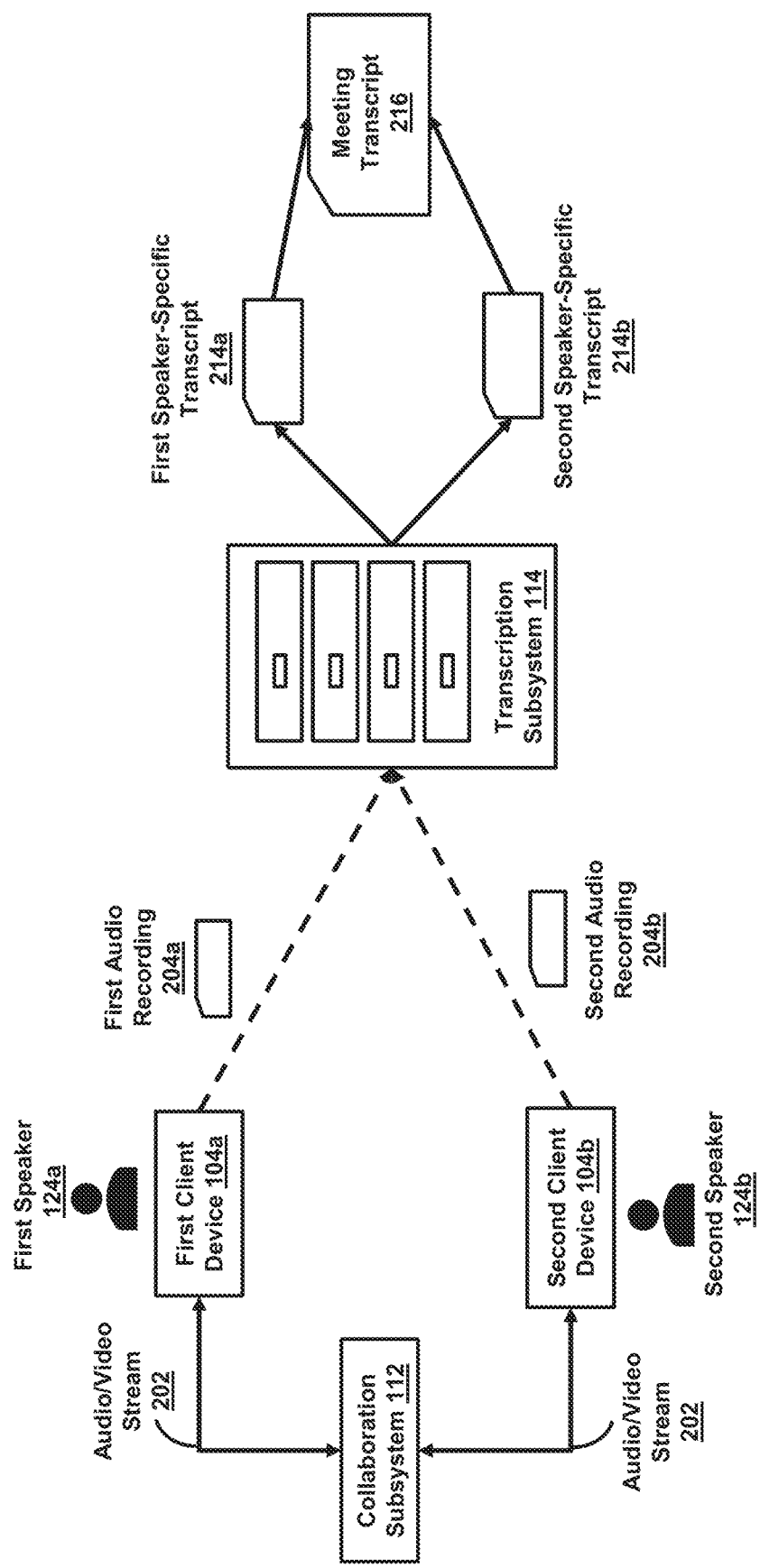
FIG. 2 is a block diagram showing generation of a meeting transcript using speaker-specific audio recordings, consistent with various embodiments.

FIG. 2 is a block diagram showing generation of a meeting transcript using speaker-specific audio recordings, consistent with various embodiments. The collaboration subsystem 112 facilitates an online meeting between speakers 124 (e.g., first speaker 124a and second speaker 124b). The collaboration subsystem 112 receives AV data from first speaker 124a and second speaker 124b, combines them into an AV stream 202 and broadcasts AV stream 202 to the client devices 104 (e.g., first client device 104a of first speaker 124a and second client device of 104b of second speaker 124b). The collaboration subsystem 112 may also send an instruction to first client device 104a and second client device 104b to record a voice of the speakers. As an example, first client device 104a records a voice of first speaker 124a to create a first audio recording 204a, and stores first audio recording 204a locally (e.g., in a memory or other storage device associated with first client device 104a). The collaboration subsystem 112 may instruct first client device 104a to transmit first audio recording 204a to transcription subsystem 114, which may transcribe first audio recording 204a to generate first speaker-specific transcript 214a. The first speaker-specific transcript 214a includes a text of the speech of first speaker 124a.

Similarly, a second client device 104b may record a voice of second speaker 124b to create second audio recording 204b and transmit second audio recording 204b to transcription subsystem 114, which may transcribe second audio recording 204b to generate a second speaker-specific transcript 214b. The second speaker-specific transcript 214b includes a text of the speech of second speaker 124b.

After generating a speaker-specific transcript for all speakers 124, transcription subsystem 114 may merge the speaker-specific transcripts 214 to generate meeting transcript 216, which includes a text of the speech from all speakers in the meeting. As an example, transcription subsystem 114 may merge first speaker-specific transcript 214a and second speaker-specific transcript 214b to generate meeting transcript 216, which includes a text of the speech from both the first speaker 124a and second speaker 124b. In some embodiments, transcription subsystem 114 may merge the speaker-specific transcripts 214 based on a timestamp associated with the text of each speaker-specific transcript. The transcription subsystem 114 may assign a timestamp to the text in a speaker-specific transcript, and the timestamp may be assigned at various granularity levels (e.g., word-level, phrase-level, sentence level, or other levels). The transcription subsystem 114 may use the timestamp to determine the sequence of the text in meeting transcript 216.

In some embodiments, the speaker-specific audio recordings 204 are stored at the respective client devices 104 and may be automatically deleted based on one or more triggers (e.g., after the meeting concludes, after the audio recording is uploaded to transcription subsystem 114, or upon other triggers). The client devices 104 may be configured to transmit the speaker-specific audio recordings 204 to transcription subsystem 114 in one of various ways. As an example, collaboration subsystem 112 may instruct first client device 104a to transmit first audio recording 204a in real time (e.g., as and when first speaker 124a speaks or first audio recording 204a is created). As another example, collaboration subsystem 112 may instruct first client device 104a to transmit first audio recording 204a asynchronously (e.g., independent of when the speakers speak, when the meeting concludes, or other condition). As another example, collaboration subsystem 112 may instruct first client device 104a to transmit first audio recording 204a based on an availability of network bandwidth during the meeting. In some embodiments, the first client device 104a may transmit first audio recording 204a if the available network bandwidth between first client device 104a and computer system 102 is above a bandwidth threshold. The bandwidth threshold may be defined by a user, e.g., an administrator or other user associated with collaboration subsystem 112. In some embodiments, the bandwidth threshold for transmitting the audio recording may be set such that any transmission of the audio recording during the meeting does not deteriorate user experience in real-time collaboration. User experience may deteriorate when there is (a) a delay in receiving AV data of another speaker, (b) a loss in AV data received from another speaker, (c) an echo in audio, (d) a jitter in video, or other factors. In some embodiments, each client device can decide how to transmit the audio recording based on network bandwidth availability of that client device.

The transcription subsystem 114 may be configured to generate speaker-specific transcripts 214 or meeting transcript 216 in one of various ways. As an example, transcription subsystem 114 may generate the transcripts in real time (e.g., as and when a speaker speaks). As an example, transcription subsystem 114 may generate the transcripts asynchronously (e.g., independent of when the speakers speak or when the meeting concludes). Further, collaboration subsystem 112 may display meeting transcript 216 to speakers 124 in real time (e.g., as and when a speaker speaks).

While the foregoing paragraphs, describe transcription subsystem 114 as generating meeting transcript 216 by merging speaker-specific transcripts 214, the method in which meeting transcript 216 is generated is not restricted to the above described method. As an example, transcription subsystem 114 may generate meeting transcript 216 by combining the speaker-specific audio recordings into a single audio file and transcribing the combined audio file to generate meeting transcript 216. In some embodiments, transcription subsystem 114 may combine the speaker-specific audio recordings 204 to generate a master audio recording file having voices of all the speakers 124 participating in the meeting. The master audio recording file can be a multi-channel audio file in which each channel includes a voice of one of the speakers 124. A channel is typically the passage-way a signal or data is transported. In case of audio files, it is the passage or communication channel in which a sound signal is transported from the player source to the speaker. An audio file can contain one or more channels. As an example, transcription subsystem 114 may combine first audio recording 204a and second audio recording 204b to generate the master audio recording file having two channels in which a first channel includes the voice of first speaker 124a and a second channel includes a voice of second speaker 124b. The transcription subsystem 114 may then transcribe the master audio recording file to generate meeting transcript 216.

Subsystems 112-118

In some embodiments, collaboration subsystem 112 facilitates management (e.g., generating or editing) of online meeting between speakers 124. For example, collaboration subsystem 112 can initiate an online meeting between speakers 124, which can include setting up an AV stream between client devices 104, receiving AV data from each of the speakers 124, processing the AV data from the speakers to generate a combined AV stream and broadcasting the AV stream to client devices 104. The collaboration subsystem 112 also coordinates with the client devices 104 and transcription subsystem 114 to generate speaker-specific transcripts 214 or meeting transcript 216.

The collaboration subsystem 112 also provides various other online meeting features. As an example, collaboration subsystem 112 allows speakers to send a meeting invitation to one or more speakers to join the online meeting. The meeting invitation can be sent via email, text, app notification in a mobile device, or other modes. As another example, collaboration subsystem 112 provides a text chat feature, which allows speakers 124 to chat with one another via text. As another example, collaboration subsystem 112 provides a screen share feature, which allows a speaker to share contents displayed on a screen of the speaker's client device with other speakers. As another example, collaboration subsystem 112 provides a screen recording feature, which allows a speaker to record contents displayed on a screen of the speaker's client device and user interactions performed on the screen. As another example, collaboration subsystem 112 provides AV recording feature, which allows a speaker to record audio/video feed received from one or more speakers during the meeting.

The collaboration subsystem 112 also provides various ways to access the speaker-specific transcripts 214 or meeting transcript 216. As an example, collaboration subsystem 112 can display the speaker-specific transcripts 214 or meeting transcript 216 to speakers 124 in real-time. As another example, collaboration subsystem 112 may display speaker-specific transcripts 214 selectively, that is, a speaker may choose (e.g., via a graphical user interface) one or more speakers whose transcript the speaker would like to be displayed. As another example, collaboration subsystem 112 can provide access to speaker-specific transcripts 214 or meeting transcript 216 based on access permissions. That is, a speaker-specific transcript or meeting transcript may be configured to be accessed by one or more speakers (e.g., specific users in an organization, or other users) or one or more groups of speakers (e.g., participants in the meeting, specific teams in an organization, users with specific roles in an organization, or other groups).

The collaboration subsystem 112 can also provide various analytics having different types of information about the meeting. Examples of such analytics are described at least with reference to feature extraction subsystem 116 and analytics subsystem 118 below.

In some embodiments, as described above, transcription subsystem 114 facilitates generation of speaker specific transcripts or meeting transcript. The transcription subsystem 114 can generate meeting transcript 216 from speaker-specific transcripts 214 or master audio recording file. The transcription subsystem 114 may use one of many transcription services from a third party, or use a customized transcription method (e.g., developed based on data collected and processed over time) to generate meeting transcript 216 or speaker-specific transcripts 214. The transcription subsystem 114 may use automatic speech recognition (ASR), natural language processing (NLP), machine learning (ML), artificial intelligence (AI) or other techniques in generating the transcripts.

In some embodiments, transcription subsystem 114 may revise a speaker-specific transcript or meeting transcript using specific vocabulary that is determined based on features related to domain-knowledge or information about participants in meetings (e.g., industry-specific information, names of participants, names of projects, etc.). Such a revised transcript may have text or content that is more relevant to a context of the meeting. The customized knowledgebase can be built either implicitly (e.g., by automatically collecting relevant information from past meetings) or explicitly (e.g., user input). In some embodiments, a semi-supervised approach may also be considered to improve the transcription, where transcription subsystem 114 first collects a list of candidates (e.g., words or groups of words from transcripts, named entities, keywords, tags, words of low confidence transcription, etc.), and then prompt the users to confirm their relevance or provide additional input. In some embodiments, knowledge acquired over time (e.g., based on new meetings from users) can also be used to re-process past meetings, that is, creating a positive feedback loop, to provide even better analytics.

The transcription subsystem 114 may also transcribe (and/or translate) the audio recording to one or more languages. For example, the speech in the audio recording may be in a first language (e.g., English) and transcription subsystem 114 may generate the speaker-specific transcript in one or more languages (e.g., English, Hispanic, Persian, Chinese, Hindi, Arabic or other languages).

The transcription subsystem 114 may assign unique IDs to speaker-specific audio recordings 204 upon receipt from client devices 104. The unique ID may be generated in various ways and may be based on one or more of a hash of the audio recording file, a speaker ID, a device ID of the client device from which the audio recording is received, a meeting ID that is unique across meetings, a date and time of the meeting, or other parameters. This unique ID may be used to access the audio recording as well as various analytics associated with the audio recording.

The transcription subsystem 114 can split an audio recording to multiple chunks and transcribe the chunks in parallel, thereby increasing the speed and minimizing the time taken to generate the transcript. For example, transcription subsystem 114 can split first audio recording 204a into multiple 2-minute chunks (or other sized chunks) and transcribe the chunks in parallel to generate multiple transcript portions, and combine the transcript portions to generate first speaker-specific transcript 214a. In some embodiments, transcription subsystem 114 may start the transcription concurrently for all speakers and persist the speaker-specific transcript alongside the speaker-specific audio recording.

In some embodiments, transcription subsystem 114 may assign a "tag" to a portion of a transcript. For example, a speaker may request the collaboration subsystem 112 to tag a portion of the transcript (e.g., a sentence in the transcript) as important. The transcription subsystem 114 may associate a "highlight" or "important" tag with the portion of the transcript. When the transcript is displayed to the speakers 124, the tagged portion of the transcript may be displayed in a specific format that is distinct from other portions that are not tagged with the highlight or important tag. For example, the tagged portion can be displayed in a specified color, font, style (e.g., italics, underline) or other format different from the other portions of the transcript. In some embodiments, a user may choose the specific format in which the portions of the transcript with "highlight" or "important" tag may be displayed.

The transcription subsystem 114 may generate a data structure to store a transcript. The data structure may include the text of the speech and other metadata such as a timestamp associated with the text, speaker information, date and time of the meeting, duration of the meeting, tags associated with the transcript, or other information. The transcription subsystem 114 may display one or more of the metadata in the transcript.

In some embodiments, feature extraction subsystem 116 processes an audio recording (e.g., first audio recording 204a or other audio recordings) or a transcript (e.g., first speaker-specific transcript 214a, meeting transcript 216, or other transcript) to extract multiple features associated with the meeting. A feature describes or indicates a characteristic of the meeting. The features can include vocabulary, semantic information of conversations, summarization of a call, voice signal associated features (e.g., a speech rate, a speech volume, a tone, and a timber), emotions of speakers (e.g., fear, anger, happiness, timidity, fatigue), personal attributes of speakers (e.g., an age, an accent, and a gender), non-aural features (e.g., visual features such as body language or facial expressions of the speaker), or any other features. The features can also include subject matter related features such as a subject of the meeting, an industry or technology area related to the meeting, a product or service discussed during the meeting, or other features. The feature extraction subsystem 116 can extract or determine the features using various techniques, e.g., rule-based, ASR, NLP, AI, ML techniques. Some of the ML algorithms that can be used include a support vector machine (SVM), a deep neural network (DNN), convolution neural network (CNN), or other algorithms.

In some embodiments, analytics subsystem 118 processes the features to determine various analytics that can provide different types of information regarding the meeting or speakers. Following are examples of different analyses performed on transcripts, and how they contribute to the final information shown to speakers or other users:

Syntactic analysis—In some embodiments, analytics subsystem 118 performs analyses of the input text such as: sentence segmentation, tokenization, part-of-speech (POS) tagging, dependency parsing, etc. The syntactic analysis may create a better representation of the input text, as a rich data-structure, allowing all sub-sequent analyses to re-use information extracted at this stage.

(Named) Entity recognition—In this analysis, analytics subsystem 118 may identify and extract groups of words representing entities such as: names of persons, organizations, places, etc. At this stage, analytics subsystem 118 can leverage domain-knowledge possessed about a speaker or an organization to which the speaker belongs (e.g., either explicitly provided to computer system 102 or automatically collected by computer system 102 over time) to customize the analysis and increase coverage and precision.

Structured data extraction—In this analysis, analytics subsystem 118 may detect groups of words having a specific interest for the purpose of weighting important sentences, linking intents to timelines (e.g., Gant chart), or providing rich interactions with transcripts (e.g., highlighting specific portions of the transcript discussing a particular person, subject or other information). As an example, analytics subsystem 118 may detect entities such as amounts of currency, distances, durations, emails, phone numbers, addresses, quantities, times (e.g.: "next week", "3rd of July", "Christmas"), etc.

Co-reference resolution—In some embodiments, multiple expressions in a transcript can refer to the same entity. In co-reference resolution, analytics subsystem 118 may identify the list of expressions referring to the same entity. For example, in the sentences "John is working on task A this week. He will try to finish this in the next 3 days.", "John" and "He" may refer to the same entity. The analytics subsystem 118 may identify that both "John" and "He" refer to the same entity. In some embodiments, such an analysis may be helpful in accurately assigning tasks/intents/action items detected in transcripts to specific entities. Moreover, in this example, by detecting features such as quantities and times (e.g., "this week" or "3 days") the analytics subsystem 118 may provide useful information to the speakers or other users.

Intent detection—In this analysis, analytics subsystem 118 may detect intent from text by analyzing linguistic features in the transcript (e.g., building upon the "syntactic analysis" step). The analytics subsystem 118 may perform this analysis based on expert domain knowledge or data from past transcripts. The analytics subsystem 118 may also able to detect features like "John will be working on A" or "We want to release our next version in two weeks", etc. which, combined with other analyses performed on the text, may allow analytics subsystem 118 to link intents to subjects and timelines (e.g., when available), such as who is doing what, and when.

Key phrases detection—In some embodiments, analytics subsystem 118 may analyze the transcripts and choose a few sentences from each transcript which analytics subsystem 118 may identify as having a specific interest, or containing more information than the average sentence and provide them as "important" portions. "Importance" may be defined in many ways, but to decide what to extract the analytics subsystem 118 can leverage information about intents detected, times, names of persons/projects/companies, etc. In some embodiments, analytics subsystem 118 may use the domain knowledge (e.g., customized for each speaker, or an organization or other entity) as well as the information the analytics subsystem 118 extracted beforehand for this meeting to determine the important information.

Generative summary—In some embodiments, analytics subsystem 118 may provide a short, automatically generated abstract or summary of each transcript, condensing the gist of the information about a meeting. For example, the summary can be "This meeting was about discussing tasks to reach our next milestone on project A".

The analytics subsystem 118 may provide a variety of information to users via the various analytics. The speakers or other users may access the analytics in the app, or a webpage associated with computer system 102. In some embodiments, the analytics subsystem 118 may not display all information, and not everything will be explicitly shown to speakers. Some of this knowledge could be used to make informed decisions for enhancing user experience and displaying transcripts in a better way which maximizes productivity. Some information can be highlighted (e.g., key phrases, named entities) to help users identify important parts of transcripts. In some embodiments, based on the action items and intents determined by analytics subsystem 118, collaboration subsystem 112 can create tasks or tickets in project management tools, saving time for users.

In some embodiments, analytics subsystem 118 generates the analytics using an "unsupervised" learning approach (e.g., without intervention of and input from users). The analytics subsystem 118 may also generate the analytics using a supervised learning approach where analytics subsystem 118 may prompt the users to give feedback and propose corrections (e.g., correcting a transcription, identifying a missed named entity, deleting a false positive detection of organization or project, etc.). Such supervised learning may increase the quality or improve the accuracy of the analytics.

The database 132 can be used to store various types of data. For example, the database 132 may store user information (e.g., username, user ID, email ID, phone number or other contact information), information about an organization of which the speakers 124 are a part, speaker-specific audio recordings, master audio recordings, speaker-specific transcripts, meeting transcript, various analytics, or other information. The system 100 can include one or more databases 132, and the database 132 can be a distributed database (e.g., database 132 can be located one or more computing devices in system 100).

Example Flowcharts

Figure 3:
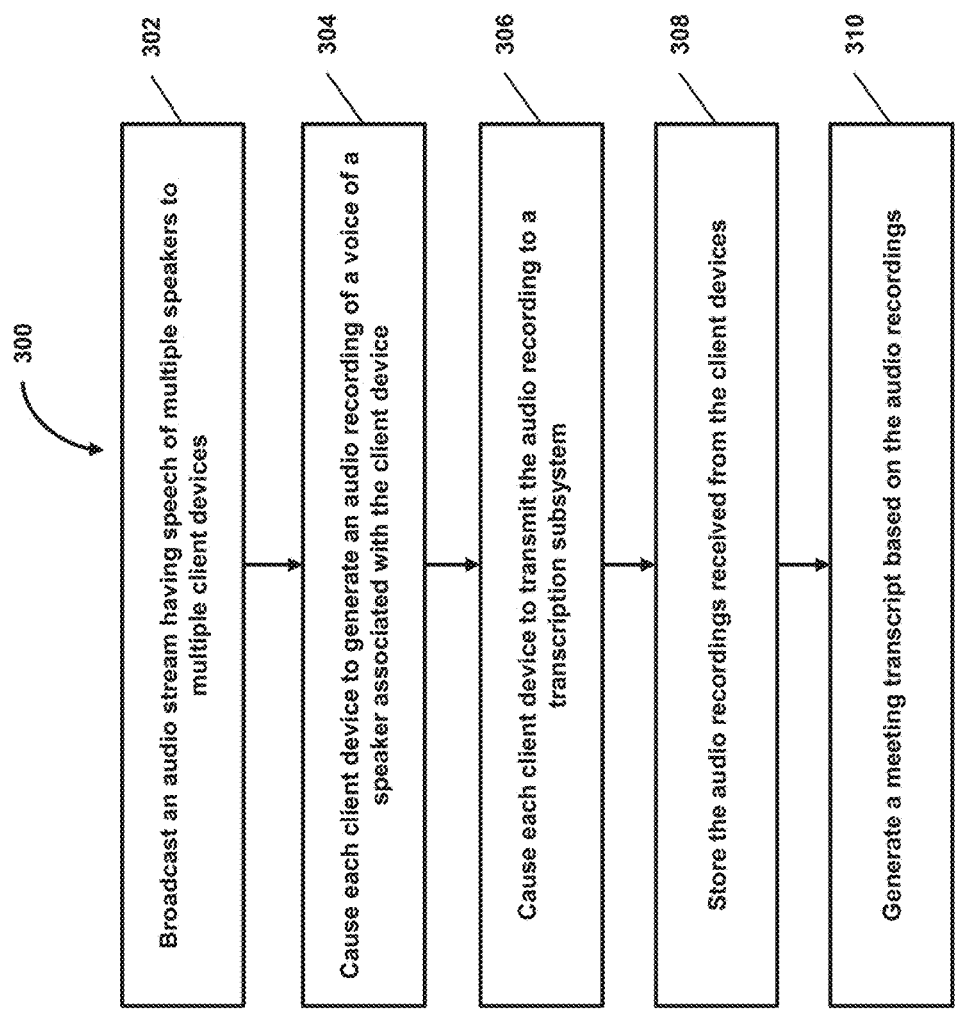
FIG. 3 shows a flowchart of a method for facilitating generation of a meeting transcript, in accordance with one or more embodiments.

FIGS. 3-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 for facilitating generation of a meeting transcript, in accordance with one or more embodiments. In an operation 302, an audio stream having AV data received from one or more speakers 124 participating in a meeting is broadcasted to client devices 104 associated with speakers 124. As described above, the AV stream may carry the AV data from all speakers 124 in a single channel. The AV data may include audio feed or video feed received from client devices 104. Operation 302 may be performed by a subsystem that is the same as or similar to collaboration subsystem 112, in accordance with one or more embodiments.

In an operation 304, each client device 104 is caused to record a voice of a speaker associated with the corresponding client device 104 to generate a speaker-specific audio recording. As an example, first client device 104a is caused to record a voice of first speaker 124a to generate first audio recording 204a. Operation 304 may be performed by a subsystem that is the same as or similar to collaboration subsystem 112, in accordance with one or more embodiments. As an example, collaboration subsystem 112 may instruct the client device to initiate the recording.

In an operation 306, each client device 104 is caused to transmit the speaker-specific audio recording to transcription subsystem 114. As an example, first client device 104a is caused to transmit first audio recording 204a to transcription subsystem 114. Operation 306 may be performed by a subsystem that is the same as or similar to collaboration subsystem 112, in accordance with one or more embodiments. As an example, collaboration subsystem 112 may instruct the client device to transmit the speaker-specific audio recording. Further, as described above at least with reference to FIGS. 1 and 2, first client device 104a is caused to transmit first audio recording 204a to transcription subsystem 114 in real-time or asynchronously.

In an operation 308, the speaker-specific audio recordings received from client devices 104 are stored at the transcription subsystem 114 (e.g., in database 132). Operation 308 may be performed by a subsystem that is the same as or similar to transcription subsystem 114, in accordance with one or more embodiments.

In an operation 310, a meeting transcript is generated using the speaker-specific audio recordings. The meeting transcript includes a text of the speech from all speakers 124 in the meeting. Additional details with respect to generating the meeting transcript are described at least with reference to FIGS. 4 and 5 below. Operation 310 may be performed by a subsystem that is the same as or similar to transcription subsystem 114, in accordance with one or more embodiments.

FIG. 4 shows a flowchart of a method 400 for generating a meeting transcript using speaker-specific audio recordings, in accordance with one or more embodiments. In some embodiments, the method 400 can be performed as part of operation 310 of method 300. In an operation 402, each speaker-specific audio recording is transcribed to generate a speaker-specific transcript having a text of the speech from a corresponding speaker. For example, first audio recording 204a is transcribed to generate a first speaker-specific transcript 214a having a text of the speech from first speaker 124a. Operation 402 may be performed by a subsystem that is the same as or similar to transcription subsystem 114, in accordance with one or more embodiments.

After the speaker-specific transcripts are generated for all speakers 124, in an operation 404, the speaker-specific transcripts are merged to generate a meeting transcript, which includes a text of the speech from all speakers 124 in the meeting. As an example, first speaker-specific transcript 214a and second speaker-specific transcript 214b are merged to generate meeting transcript 216. The meeting transcript 216 includes speech from both first speaker 124a and second speaker 124b. In some embodiments, the speaker-specific transcripts are merged based on a timestamp associated with the text in the speaker-specific transcripts. The timestamp may be used to determine the sequence of the text in the meeting transcript. Operation 404 may be performed by a subsystem that is the same as or similar to transcription subsystem 114, in accordance with one or more embodiments.

FIG. 5 shows a flowchart of a method 500 for generating a meeting transcript using speaker-specific audio recordings, in accordance with one or more embodiments. In some embodiments, the method 500 can be performed as part of operation 310 of method 300. In an operation 502, the speaker-specific audio recordings are combined to generate a master audio recording, which includes voices of all speakers 124 participating in a meeting. For example, first audio recording 204a and second audio recording 204b are combined to generate a master audio recording, which includes the voices of both first speaker 124a and second speaker 124b. The master audio recording may be a multi-channel audio file in which voices of different speakers are stored in different channels. That is, each speaker-specific audio recording is stored in a different channel in the master audio recording. In some embodiments, any of a number of methods can be used in combining the speaker-specific audio recordings into a master audio recording. Operation 502 may be performed by a subsystem that is the same as or similar to transcription subsystem 114, in accordance with one or more embodiments.

In an operation 504, the master audio recording is transcribed to generate a meeting transcript, which includes a text of the speech from all speakers 124 in the meeting. Operation 504 may be performed by a subsystem that is the same as or similar to transcription subsystem 114, in accordance with one or more embodiments.

Figure 6:
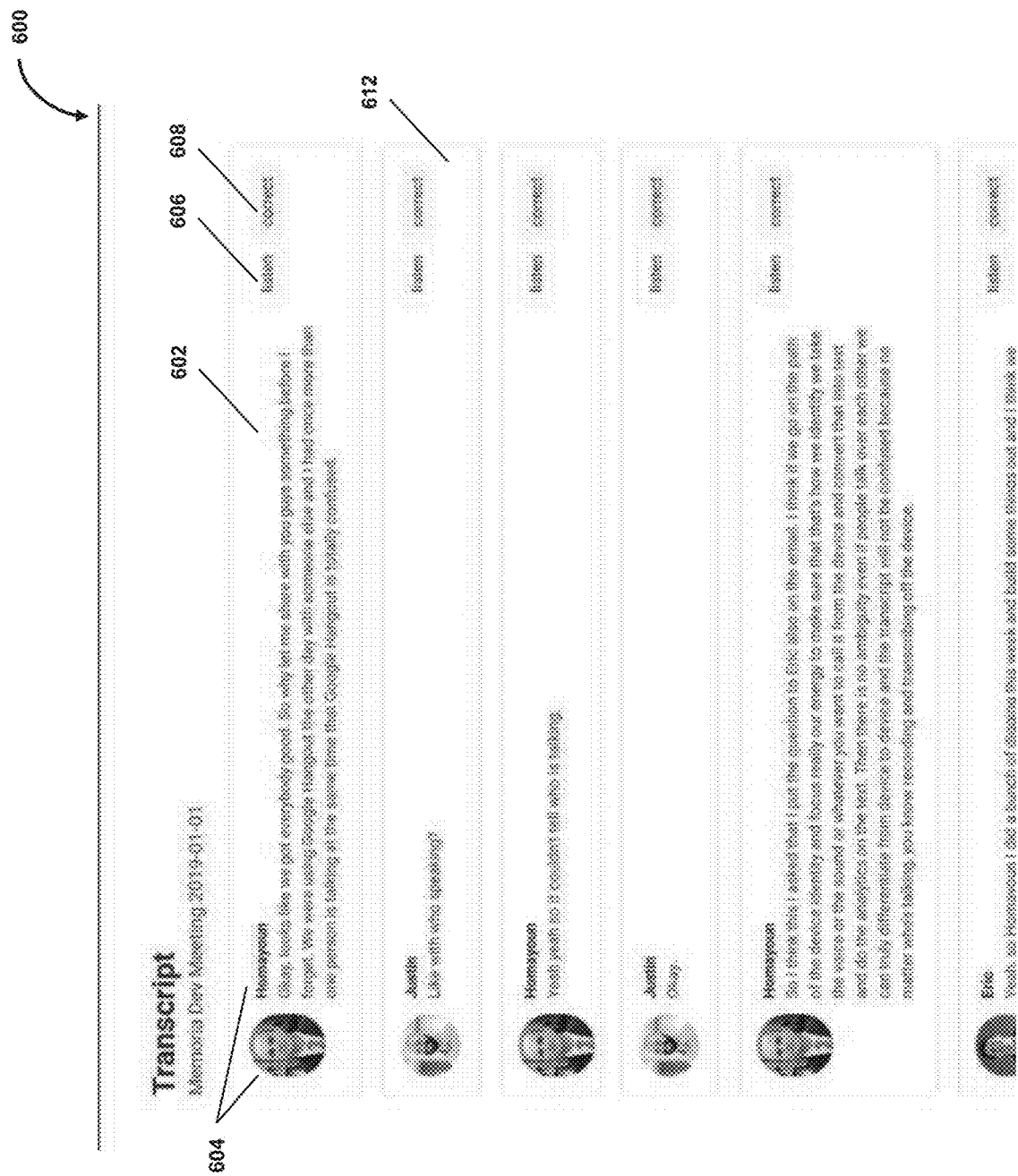
FIG. 6 is a screenshot of a graphical user interface displaying a portion of the meeting transcript, consistent with various embodiments.

FIG. 6 is a screenshot of a graphical user interface (GUI) 600 displaying a portion of the meeting transcript, consistent with various embodiments. The GUI 600 displays a meeting transcript (e.g., meeting transcript 216), which has a text of the speech of all speakers in the meeting. In some embodiments, the meeting transcript in the GUI 600 is generated in a way similar to meeting transcript 216 described above. The GUI 600 may display the meeting transcript as multiple portions, in which each portion corresponds to a text of a speech by a speaker, and display the portions based on a sequence in which the conversation progresses (e.g., using a timestamp associated with the text). The GUI 600 may also display user information (e.g., speaker name, an image of the speaker, or other information) of a speaker in association with a portion of the text corresponding to a speech of the speaker. As an example, the GUI 600 displays the meeting transcript as multiple transcript portions, including a first transcript portion 602 and a second transcript portion 612. The first transcript portion 602 corresponds to a first speaker and includes a text of the speech corresponding to a first portion of the audio recording of the first speaker. The first transcript portion 602 also displays user information 604 of the first speaker, which includes a name and a picture of the speaker. The second transcript portion 612 corresponds to a second speaker and includes a text of the speech corresponding to a first portion of the audio recording of the second speaker.

The GUI 600 also enables a speaker to listen to an audio recording of any of the speakers, or to a specific portion of an audio recording. As an example, the GUI 600 provides a first GUI element 606 in the first transcript portion 602, which a speaker can select to listen to the audio recording of the first speaker corresponding to the first transcript portion 602. In some embodiments, making an audio recording of a specific speaker available for playback is made possible by having speaker-specific audio recordings or storing the voices of different speakers in different channels of an audio stream.

The GUI 600 also enables a speaker to correct or edit a transcript. For example, a speaker can correct or otherwise edit the text in the first transcript portion 602 using a second GUI element 608. After a speaker edits the transcript, the revised transcript may be stored (e.g., in database 132) and displayed to all the speakers. The changes made to the transcript may be stored separate from the original transcript, or stored as a new version of the original transcript.

In some embodiments, the various computers and subsystems illustrated in FIG. 1 may include one or more computing devices that are programmed to perform the functions described herein. The computing devices may include one or more electronic storages (e.g., database(s) 132), one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of computer system 102 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some, or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

What is claimed is:

1. A system for generating a transcript for a meeting with multiple speakers, the system comprising:
    a computer system including one or more processors programmed with computer program instructions that, when executed, cause the computer system to:
        generate, using a collaboration subsystem, an audio/video stream having audio/video data received from multiple speakers participating in a meeting, wherein each speaker participates in the meeting using a client device associated with the corresponding speaker;
        broadcast, using the collaboration subsystem, the audio/video stream to the client devices;
        cause, using the collaboration subsystem, each client device to record speech of a speaker associated with corresponding device to generate a device-specific audio recording at the corresponding client device;
        instruct, using the collaboration subsystem, each client device to transmit the device-specific audio recording asynchronously during the meeting based on an available bandwidth between each client device and the collaboration subsystem being above a bandwidth threshold;
        store, at a transcription subsystem, the device-specific audio recording received from each client device, the device-specific audio recording being distinct from the audio/video stream;
        generate, via the transcription subsystem, a speaker-specific transcript of each device-specific audio recording to generate multiple speaker-specific transcripts, wherein each speaker-specific transcript includes a text of a speech from a speaker of the speakers corresponding to the client device from which the device-specific audio recording is received; and
        process, via the transcription subsystem, the speaker-specific transcripts to generate a meeting transcript, the meeting transcript including a text of the speech from each speaker.

2. The system of claim 1, wherein the computer system is caused to:
    generate the meeting transcript by merging the text of the speech from the speaker-specific transcripts based on a timestamp associated with the text of the speech in each speaker-specific transcript.

3. The system of claim 1, wherein the computer system is caused to:
    broadcast the meeting transcript to the client devices.

4. The system of claim 1, wherein the computer system is caused to:
    generate the meeting transcript in real-time during the meeting.

5. The system of claim 1, wherein the computer system is caused to:
    generate the meeting transcript asynchronously after the meeting has concluded.

6. A method implemented by one or more processors executing computer program instructions that, when executed, perform the method, the method comprising:
broadcasting an audio/video stream to multiple client devices, the audio/video stream including audio/video data of multiple speakers participating in a meeting, wherein each speaker participates in the meeting using a client device of the multiple client devices associated with the corresponding speaker;
causing a first client device of the client devices to generate a first audio recording having a voice of a first speaker of the multiple speakers, the first speaker associated with the first client device;
instructing the first client device to transmit the first audio recording asynchronously during the meeting based on an available bandwidth being above a bandwidth threshold;
receiving, at a transcription subsystem, the first audio recording from the first client device, the first audio recording being independent of and distinct from the audio/video stream;
storing, at the transcription subsystem, the first audio recording, wherein the first audio recording is one of multiple audio recordings stored at the transcription subsystem, wherein each audio recording includes a voice of a speaker of the multiple speakers and is received from a client device of the client devices associated with the speaker; and
generating a meeting transcript based on the multiple audio recordings, the meeting transcript including a text of the speech from each speaker.

7. The method of claim 6, wherein generating the meeting transcript includes:
generating, at the transcription subsystem, multiple speaker-specific transcripts based on the audio recordings.

8. The method of claim 7, wherein generating the multiple speaker-specific transcripts includes:
generating a first speaker-specific transcript based on the first audio recording, the first speaker-specific transcript having a text of a speech from the first speaker, and generating a second speaker-specific transcript based on a second audio recording of the multiple audio recordings, the second speaker-specific transcript having a text of a speech from a second speaker of the multiple speakers, the second audio recording received from a second client device of the client devices, the second client device associated with the second speaker.

9. The method of claim 8, wherein generating the first speaker-specific transcript includes:
generating the first speaker-specific transcript in real-time during the meeting.

10. The method of claim 8, wherein generating the first speaker-specific transcript includes:
generating the first speaker-specific transcript asynchronously after the meeting has concluded.

11. The method of claim 8, wherein generating the first speaker-specific transcript includes:
generating the first speaker-specific transcript in response to receiving at least a portion of the first audio recording.

12. The method of claim 8, wherein generating the first speaker-specific transcript includes:
splitting, at the transcription subsystem, the first audio recording into multiple chunks, and generating a transcript of each chunk in parallel.

13. The method of claim 8, wherein generating the first speaker-specific transcript includes:
translating, at the transcription subsystem, the speech in the first audio recording from a first language to a second language, and
generating the first speaker-specific transcript in the second language.

14. The method of claim 8 further comprising:
providing, at the first client device, a graphical user interface for user selection of one or more of the speaker-specific transcripts;
receiving a user selection of the first speaker-specific transcript; and
displaying the first speaker-specific transcript at the first client device.

15. The method of claim 8 further comprising:
providing, at the first client device, a graphical user interface for user selection of a portion of a specified audio recording of the audio recordings corresponding to a specified speaker of the speakers;
receiving a user selection of the portion of the specified audio recording; and
playing the portion of the specified audio recording at the first client device.

16. The method of claim 8 further comprising:
receiving a request from the second speaker to associate a highlight tag with a portion of the speech from the first speaker;
associating the highlight tag with the portion of the speech from the first speaker; and
displaying the portion of the speech from the first speaker in a user-specified format that is distinct from portions of the speech not associated with the highlight tag.

17. The method of claim 7 further comprising:
generating, using the transcription subsystem, the meeting transcript based on the speaker-specific transcripts.

18. The method of claim 17, wherein generating the meeting transcript includes:
processing, using the transcription subsystem, the speaker-specific transcripts based on a timestamp associated with the text of the speech in each speaker-specific transcript to generate the meeting transcript.

19. The method of claim 17 further comprising:
determining multiple features from the meeting transcript, wherein the features indicate characteristics of the meeting; and
processing the multiple features to generate multiple analytics associated with the meeting.

20. The method of claim 19, wherein determining the features or processing the features is performed using rule-based, natural language processing, machine learning, or other artificial intelligence techniques.

21. The method of claim 19, wherein processing the features includes:
generating a summary of the meeting based on one or more of the features.

22. The method of claim 19, wherein processing the features includes:
revising the meeting transcript based on one or more of the features to generate a revised meeting transcript, the revised meeting transcript having text that is relevant to a context of the meeting.

23. The method of claim 17, wherein generating the meeting transcript includes:
displaying the meeting transcript to the first speaker, receiving, from the first speaker, user input for revising at least a portion of the meeting transcript, generating a revised meeting transcript based on the user input, and displaying the revised transcript to the speakers.

24. The method of claim 6, wherein receiving the first audio recording includes:
causing the first client device to transmit the first audio recording to the transcription subsystem in real-time during the meeting.

25. The method of claim 6, wherein receiving the first audio recording includes:
causing the first client device to transmit the first audio recording to the transcription subsystem based on an availability of network bandwidth.

26. The method of claim 6 further comprising:
generating a master audio recording based on the audio recordings, wherein the master audio recording includes multiple channels in which each channel has one of the audio recordings.

27. The method of claim 26 further comprising:
generating a meeting transcript based on the master audio recording.

28. The method of claim 6, wherein storing the first audio recording includes:
assigning a unique identification (ID) to the first audio recording, wherein the unique ID is based on at least one of a device ID of the first client device or a user ID of the first speaker.

29. The method of claim 6 further comprising:
setting access permissions to the first audio recording; and
permitting one or more of the speakers or a group of the speakers to access the first audio recording based on the access permissions.

30. A non-transitory computer-readable medium storing instructions that, when executed by one or more processors, cause operations to be implemented on a computer system, the operations comprising:
broadcasting an audio/video stream to multiple client devices, the audio/video stream having audio/video data received from multiple speakers participating in a meeting, wherein each speaker participates in the meeting using a client device of the multiple client devices associated with the corresponding speaker;
causing each client device to:
generate an audio recording having a voice of a speaker of the multiple speakers associated with the corresponding client device, and
transmit the audio recording to a transcription subsystem asynchronously based on a received instruction at each client device during the meeting based on an available bandwidth being above a bandwidth threshold;
storing, at the transcription subsystem, the audio recordings; and
generating a speaker-specific transcript based on the audio recordings, wherein each speaker-specific transcript includes a text of a speech of the speaker associated with the client device from which the corresponding audio recording is received.

31. The computer-readable medium of claim 30, the operations further comprising:
generating a meeting transcript based on the speaker-specific transcripts, the meeting transcript including a text of a speech of each speaker.

* * * * *